US010324825B2

(12) United States Patent
Duer et al.

(10) Patent No.: US 10,324,825 B2
(45) Date of Patent: *Jun. 18, 2019

(54) VISUALIZATION OF SECURITY WARNING SOLUTION POINTS

(71) Applicant: International Business Machines Corporation, Armonk, NY (US)

(72) Inventors: Kristofer A. Duer, Littleton, MA (US); John T. Peyton, Arlington, MA (US); Johnathan D. Smith, Gainsville, FL (US); Stephen D. Teilhet, Milford, NH (US); Jason N. Todd, Lunenburg, MA (US); Lin Tan, Waterloo (CA); Jinqiu Yang, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,843

(22) Filed: Aug. 14, 2018

(65) Prior Publication Data
US 2018/0357151 A1 Dec. 13, 2018

Related U.S. Application Data

(63) Continuation of application No. 15/274,019, filed on Sep. 23, 2016, now Pat. No. 10,089,215.

(51) Int. Cl.
*G06F 9/44* (2018.01)
*G06F 11/36* (2006.01)
*G06F 21/57* (2013.01)

(52) U.S. Cl.
CPC ........ *G06F 11/3664* (2013.01); *G06F 21/577* (2013.01); *G06F 2221/033* (2013.01)

(58) Field of Classification Search
None
See application file for complete search history.

(56) References Cited

U.S. PATENT DOCUMENTS

| 8,302,197 | B2 | 10/2012 | Huang et al. | |
|---|---|---|---|---|
| 2006/0117302 | A1* | 6/2006 | Mercer | G06F 9/4484 717/131 |
| 2011/0271232 | A1 | 11/2011 | Crochet et al. | |
| 2016/0124724 | A1* | 5/2016 | Gautam | G06F 11/3616 717/143 |

OTHER PUBLICATIONS

Attanasio et al., "Penetrating and operating system: a study of VM/370 integrity", IBM Systems Journal 15.1, 1976, pp. 102-116.
(Continued)

*Primary Examiner* — Qamrun Nahar

(57) ABSTRACT

A source code processing application may process source code and realize the results of the code in a map configuration. In one example, the map may be displayed with a number of stations and pathways between the stations to illustrate associations with classes of the source code. An example method of operation may include one or more of retrieving source code comprising a class from memory, processing the source code to identify an error associated with the class, creating a map with a station linked to the error, and displaying the map on a device.

20 Claims, 8 Drawing Sheets

(56) References Cited

OTHER PUBLICATIONS

Dukes et al., "A case study on web application security testing with tools and manual testing", Southeastcon, 2013 Proceedings of IEEE.
Jovanovic et al., "Pixy: A static analysis tool for detecting web application vulnerabilities", Security and Privacy, 2006 IEEE Symposium on Security and Privacy.
Panas et al., "Analyzing and Visualizing Whole Program Architectures", ICSE Workshop on Aerospace Software Engineering (AeroSE), Minneapolis, MN., 2007.
Sotirov, "Automatic vulnerability detection using static source code analysis", Thesis, The University of Alabama Tuscaloosa, 2005.
Wilander, "Modeling and visualizing security properties of code using dependence graphs", Proceeding of the 5th conference on Software Engineering Research and Practice, Sweden, 2005.
Zanero et al., "Automatic detection of web application security flaws", Black Hat Briefings, 2005.

* cited by examiner

500

510 — ParameterParser.java:674
511 — ServletRequest.getParameterValues(String):String[]

```
// this.request is javax.servlet.servlc
this.request.getParameterValues(name)
```

+ 3 more
512 — ParameterParser.java:688
String.trim():String

```
// values[0] is java.lang.String
values[0].trim()
```

514 — ParameterParser.clean(String):String
ParameterParser.clean(String):String

```
// this is org.owasp.webgoat.session.Pa
// values[0] is java.lang.String
value = this.clean(values[0].trim())
```

516 — ParameterParser.getStringParameter(String):String
ParameterParser.getStringParameter(String):String

```
// this is org.owasp.webgoat.session.Pa
return this.getStringParameter(name)
```

FIG. 5

VISUALIZATION OF SECURITY WARNING SOLUTION POINTS

TECHNICAL FIELD

This application relates to creating and displaying software pathways and errors which have occurred, or are likely to occur, based on generated associations.

BACKGROUND

Conventional static application security testing (SAST) is a way for determining whether software is vulnerable to an attack from malicious users. In operation, SAST is a static analysis where the software is examined in a non-executing static state. The software code itself and any accompanying configuration files used at a runtime operation are examined in a variety of ways to predict whether the code has weaknesses that could be exploited by an attacker resulting in a vulnerability.

The techniques for making such predictions vary, but most commercial SAST tools use 'model checking', theorem proving, abstract interpretation, and other techniques that require tradeoffs in the precision of such tests in order to arrive at practical results within a reasonable time while considering space constraints on modern computing machinery.

The tradeoffs in precision and the complexity and size of modern applications (i.e., millions to tens of millions of lines of code), means that end users are usually presented with a very large set of weaknesses by the tools which render the analysis useless. To quickly arrive at an overall sense of the weakness of an application and to determine where to focus remediation efforts is a continued challenge when the list of weaknesses (also called 'findings') number in the thousands or more, commonly, tens or hundreds of thousands. For a result that takes hours to produce, the result can then take several 'person' days or weeks to determine what needs to be fixed and how much effort would be involved. Most weaknesses are presented as individual paths through an application illustrating how attack data promulgates through the code until it reaches its target. Although, many of these weaknesses are related by sharing portions of the path through the code, the individual listing makes it difficult to discern relationships between the weaknesses and obtain a clear understanding where the application needs the most attention.

SUMMARY

One example embodiment may include a method that comprises one or more of retrieving source code comprising one or more classes from memory, processing the source code to identify one or more errors associated with the one or more classes, creating a map with one or more stations linked to the errors, and displaying the map on a device.

Another example embodiment may include an apparatus comprising one or more of a processor configured to retrieve source code comprising one or more classes from memory, process the source code to identify one or more errors associated with the one or more class, create a map with one or more stations linked to the one or more errors, and display the map on a device interface.

A further example embodiment may include a non-transitory computer readable storage medium configured to store instructions that when executed cause a processor to perform one or more of retrieving a source code comprising one or more classes from memory, processing the source code to identify one or more errors associated with the one or more class, creating a map with one or more stations linked to the one or more errors, and displaying the map on a device interface.

BRIEF DESCRIPTION OF THE DRAWINGS

FIG. 5 illustrates a user interface of semantic information of classes identified during an error detection procedure according to an example embodiment.

DETAILED DESCRIPTION

Figure 1:
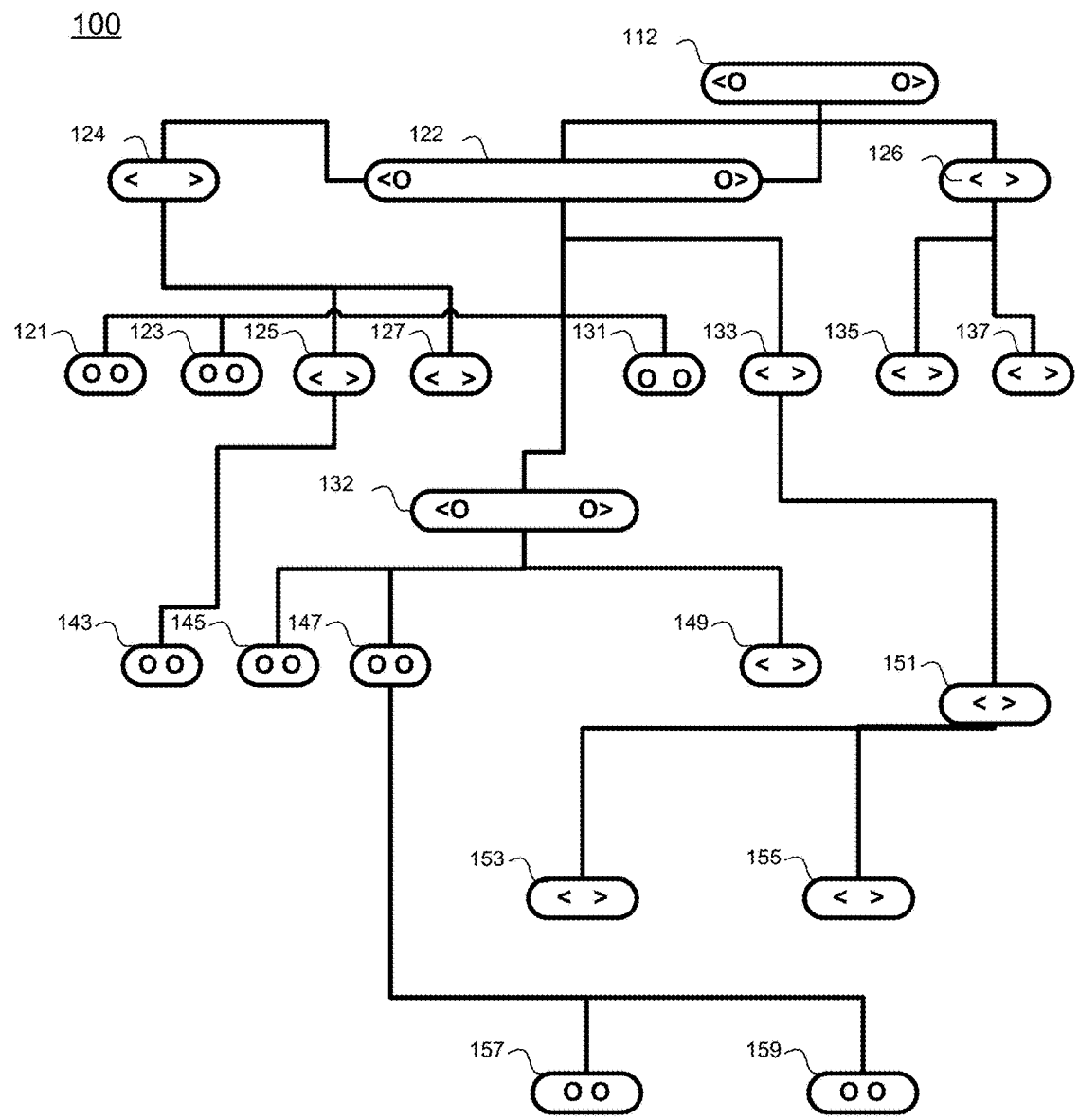
FIG. 1 illustrates an example station map visualization of the source code according to an example embodiment.

It will be readily understood that the instant components, as generally described and illustrated in the figures herein, may be arranged and designed in a wide variety of different configurations. Thus, the following detailed description of the embodiments of at least one of a method, apparatus, system, and non-transitory computer readable medium as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiment", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a software code processing procedure and visualization of a compact data flow map related to the presented security warnings identified from processing source code. The visualization of various classes and methods which are part of the source code and which are subject to errors/warnings may enable the user to select a location that has the most impact and least harm to the overall application by visualizing the density of errors throughout a station map.

The input to the visualization may be a list of observed data flow paths through an application. The semantic relationship between the data flow paths is irrelevant for building the visualization. However, data flow paths may be helpful for the result to make sense to an end-user. A data flow path is a sequence of locations in an application through which data is transmitted. The data flow paths are converted internally to a graph. The nodes or stations of the graph are unique locations represented in the paths. The edges of the graph are defined by the adjacency of two locations in a path. For example, if a segment of a path is [ . . . , A, B, C, . . . ], then the graph contains an edge (A, B) and an edge (B, C). Any self-references, such as an edge from a node directly to itself, (e.g. (A, A)) are removed. Nodes and edges are unique. Even if there are ten or twenty instances of data flowing from A to B, there will be only one edge (A, B) and only one node A and one node B.

A short linear sequence may occur in the graph. A linear sequence is a set of nodes [A, . . . , R, . . . , Z] for which the node A has out-degree one, each intermediary node R has in-degree one and out-degree one, and a final node Z has in-degree one. When drawn, these sequences form straight lines leading to the name linear sequence. Displaying these sequences in their entirety makes the resulting visualization both larger and more difficult to understand without adding useful information. In one embodiment, these sequences are collapsed into a single node A', attaching the original sequence to the new node as metadata.

For small applications, drawing each path separately produces a clear and visually appealing graph. However, for large applications the number of paths can number in the thousands. At this scale, drawing each path individually results in a visualization that is so large that users cannot see enough information at a single view to gain useful insight. For this reason, each connection between nodes will be drawn only once, in sample embodiments, instead of once for each path attached to the node. This shrinks the resulting visualization, permitting much larger applications to be effectively represented.

The nodes of the graphs generated from the source code may also be referred to as stations which are presented on a grid such that no two stations share the same grid cell. The grid is constructed dynamically during layout and is only as large as necessary to contain the graph. The stations are ordered from top to bottom by their relative positions in the data flow paths. If a station A comes before a station B in one of the paths, then the layout is soft-constrained such that the location of A will not be below the location of B on a vertical axis. Node/station A may reside at the same location on the vertical axis as B if necessary to satisfy other constraints. The term soft-constrained is used to indicate that a process attempts to satisfy the constraint, but does not treat it as a failure if the constraint cannot be satisfied. If the graph is acyclic (lacking cycles), then all these constraints can be satisfied at once. If the graph contains cycles, then not all of the constraints can be satisfied.

A cycle is a sequence of nodes of the form [A, . . . , A] where data can conceivably flow from location A through other nodes and ultimately back to location A. In this case, an arbitrary ordering is imposed based on the ordering of the data flow path list. As a result, paths are processed in the order they are given, and nodes in earlier paths will be displayed above nodes in subsequent paths when the nodes are in a cycle. The ordering is provided by the graph representation. The "top" nodes are selected by taking the nodes that have no edges leading into themselves. These edges are displayed at the top. Then, a breadth-first search is performed, with the row in which a station is placed determined by the distance it is from one of the top nodes. If there are no nodes with an in-degree 0, then the graph is completely cyclic. A cycle is arbitrarily selected and broken by removing edges until there is a top node, then the layout proceeds as it would otherwise.

The columns of the grid are divided into three regions: left, right, and center. The region where a station is placed can be determined based on whether the station has all paths passing through it, or it is the bottom-most station and has a station above it in the center or a station above it on each side of the center, then it is placed in the center. Also, if the station has the majority of its inward edges coming from one side (left or right), it is placed on that side. If the station has the majority of its inward edges coming from another station in the center, and the majority of its edges are coming from either the left or the right side of the list of edges coming out of that station, then the station is placed on the majority side. Additionally, the station could be arbitrarily placed on the left or the right. In each row, there may be only one station in the center. In each row, the left and right sides each have a stack onto which stations are placed when their side is selected. A station's location on the stack determines which column it is placed. If all edges are processed in left-to-right order, this leads to stations being placed in an order consistent with the edges leading into them.

Other rules established for mapping and visualization may include stations being placed in rows and columns that are even-numbered. If either the row or column is odd-numbered, it is reserved for placing lines between stations. Lines are placed in the grid by a depth-first search procedure that follows certain rules. For example, the search may only move left, right, up, or down and never diagonally. The search may only move horizontally in odd-numbered rows. The search may only move vertically into an even-numbered row if it is in an odd-numbered column. The search attempts to reach the correct row by moving vertically before trying to reach the correct column by moving horizontally. A line can enter a station from above and exit a station from the bottom. The grid is then mapped onto a Cartesian coordinate system used by monitors. Stations are assigned a fixed height and a width based on the maximum of the number of edges coming in and edges going out. Lines are provided with a fixed width. Row '0' has its top fixed at Y-coordinate '0'. Row heights are then computed to be just large enough to contain their contents and then expanded by a small margin. Column '0' is fixed at X-coordinate '0'. Column widths are then computed to be just wide enough to contain their contents, and then expanded by a small margin. Any rows and columns that have no content are assigned a height or width of '0', respectively. The position of a station or line is computed by taking its (row, column) coordinate pair and computing an offset by summing the heights of rows above it and summing the widths of columns between it and the center. Finally, the X-coordinates are shifted such that the leftmost coordinate of any station or line is at '0' plus a small margin.

In order to assist users in understanding the visualization, a list of the stations is placed to the left of the visualization. This list contains information identifying the location in the code that the station represents. The list of stations can also contain other metadata about the stations. This information is reproduced as tooltips which appear when a mouse is placed over a station in the visualization. The linear sequences which were collapsed in, prior to drawing the visualization, are listed in tooltips for stations in the order that the stations would have appeared if they had been drawn in full.

While the visualization is independent of any semantic information about the data flow paths, it is important that the visualization be able to reflect semantics. The data flow paths have a set of distinct classes attached to or associated with them. It is important for users to know both which classes a path belongs to and where a single code location has multiple attached classes. The information is represented on the visualization by drawing right-angle brackets at the left and right edges of stations. The brackets are colored consistently so that they can be visually identified. This permits users to quickly find classes that they are interested in by looking at the visualization. In other embodiments, the colored bracket set or sets which correspond to different classes may be identified by symbols.

FIG. 1 illustrates an example station map visualization of source code according to an example embodiment. Referring to FIG. 1, the map 100 includes various stations 112-159. Certain stations, such as 112, 122 and 132 are multiple class stations which support more than one class as indicated by the different symbols linked to the stations. Each of the other stations linked to the multiple class stations will share at least one class in common with the multiple class stations. For example, stations 124, 125, 126, 127, 133, 135, 137, 149, 151, 153 and 155 all share one class with one or more multiple class stations. Also, stations 121, 123, 131, 143, 145, 147, 157 and 159 also share another class different from the first class with one or more multiple class stations.

Figure 2:
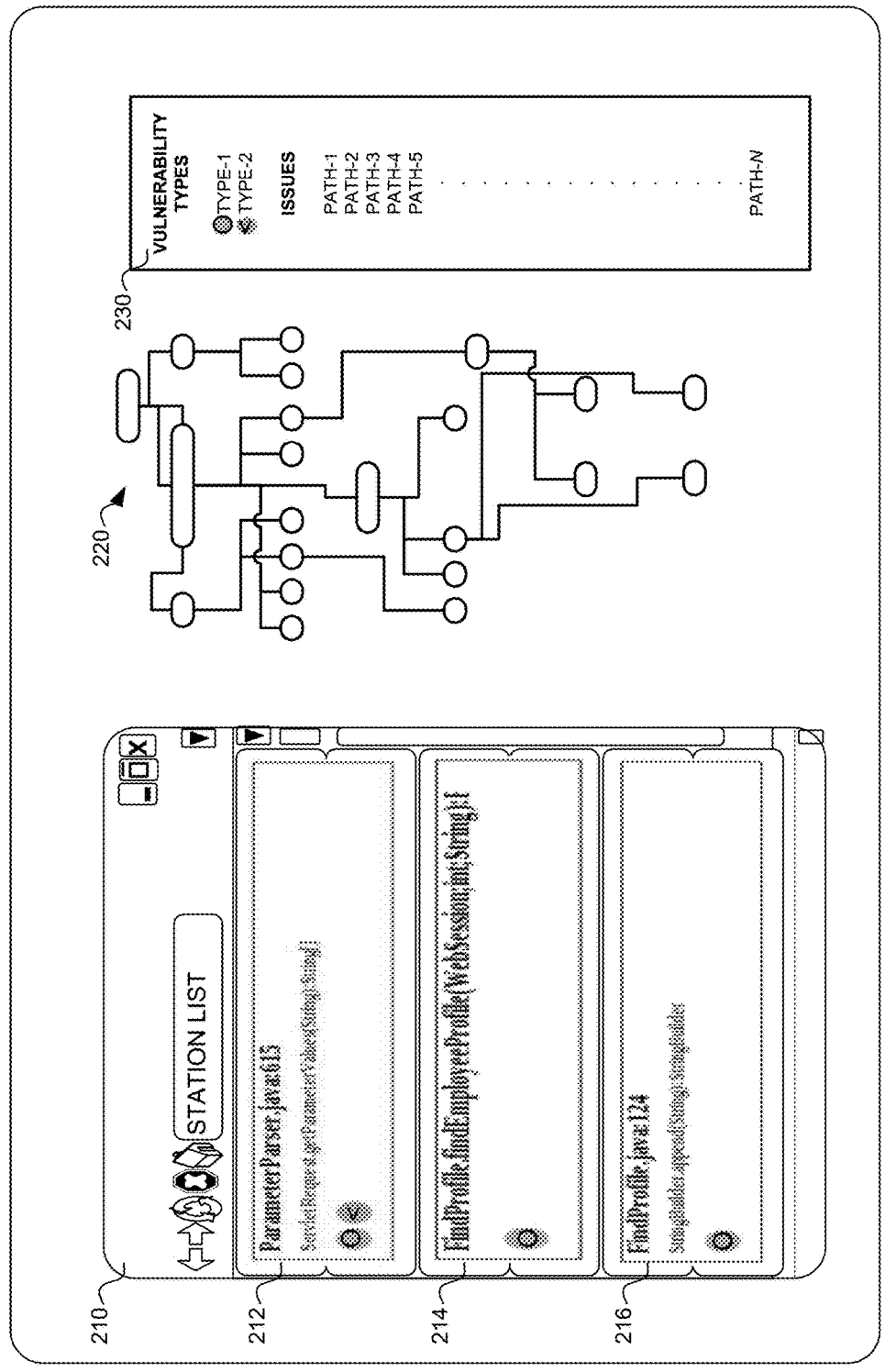
FIG. 2 illustrates a user interface with the station map and corresponding class information and path information according to an example embodiment.

FIG. 2 illustrates a user interface with a station map and corresponding class information and path information according to an example embodiment. Referring to FIG. 2, the user interface 200 includes a semantic list of stations and their respective classes 210. For example, the classes 212, 214 and 216 may be just a few sample classes that are linked to the type of errors or vulnerabilities identified in the pathways 230. The map or visualization diagram 220 is also displayed for convenience and any of the stations may be selected to see the semantic information included for that station.

Figure 3:
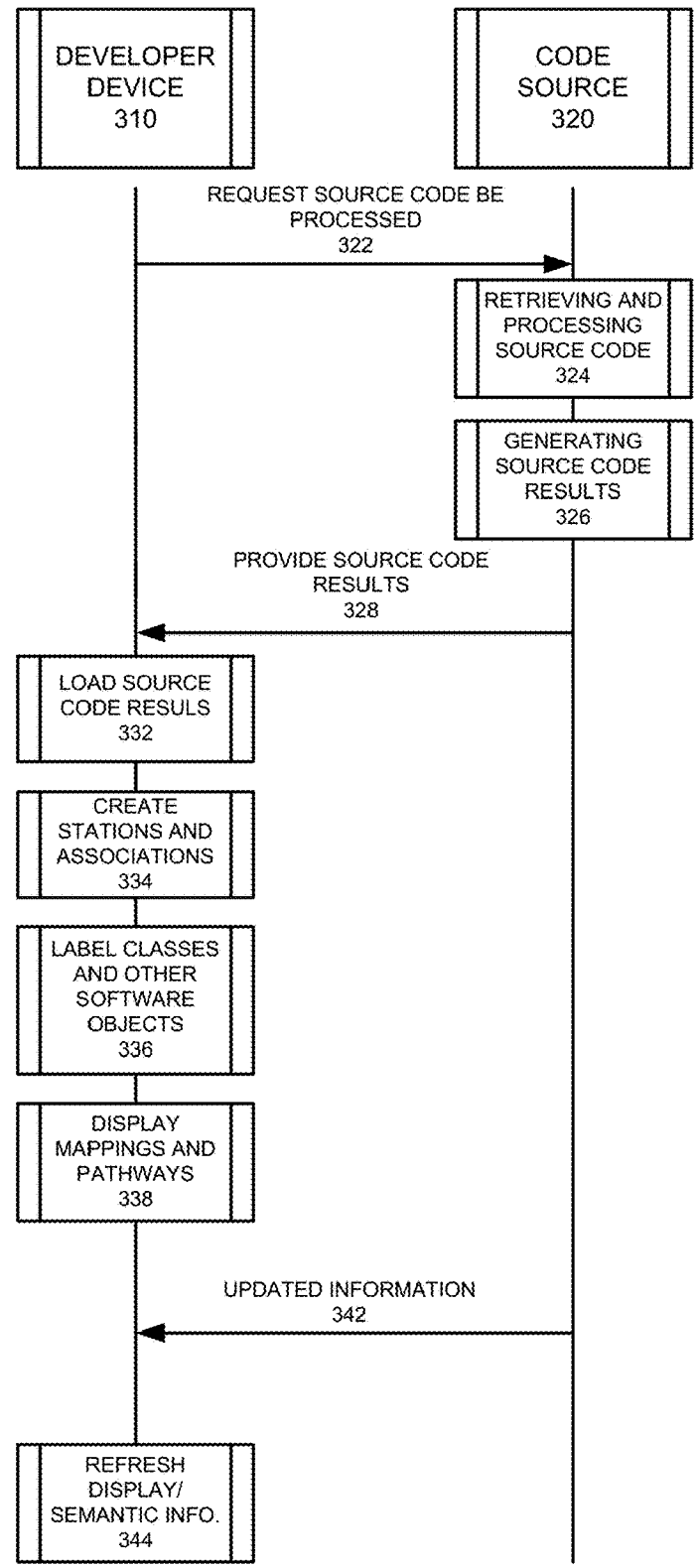
FIG. 3 illustrates an example system diagram of communication signaling between a developer device and a source code information source according to an example embodiment.

FIG. 3 illustrates an example system diagram of communication signaling between a developer device (which includes one or more processors and memory) and a source code information source or code source (which includes one or more processors and memory) according to an example embodiment. Referring to FIG. 3, system configuration 300 includes an example scenario where the developer device 310 attempts to process the visualization from developer code or source code stored in a code source 320, which can be a server or database. The developer device 310 may access the code visualization and error detection application and submit a request 322 for the source code to be retrieved, processed and populated into the user interface of the device 310. The source code source can then retrieve and process the source code 324 and generate the results of the source code processing 326. The results are then provided to the developer device 310. The results are then provided 328 to the developer device 310 and loaded 332. The visualization tool then creates stations and associations 334 and the classes are labeled with colors or symbols and map associations 336. The display is refreshed to update all the semantics and map connections 338. Over time, the updated information 342 may be provided from the source code to the developer device to ensure the data is updated and the visualization stays updated 344 with accurate information.

Figure 4:
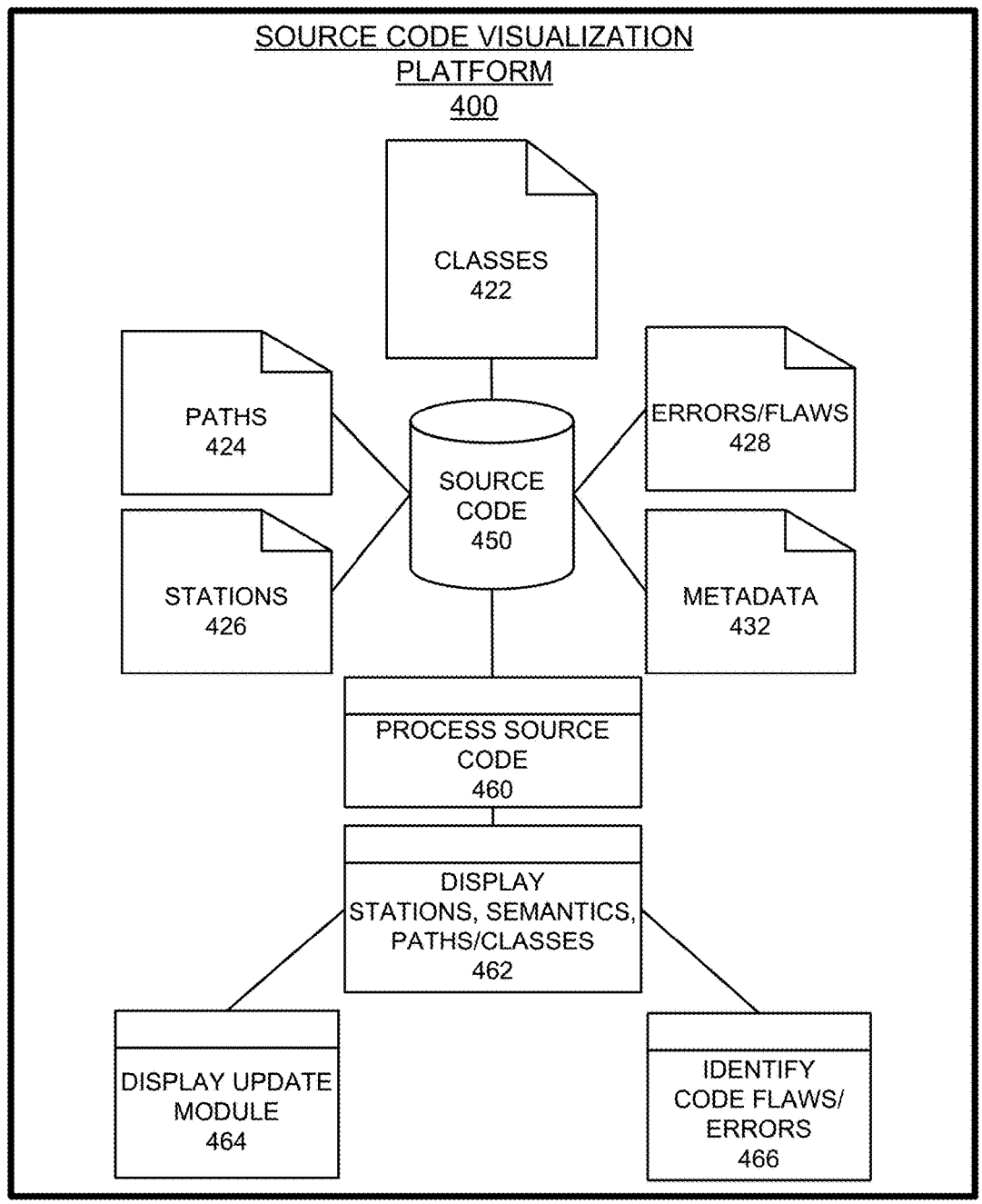
FIG. 4 illustrates a source code visualization platform with information sources and application processing according to an example embodiment.

FIG. 4 illustrates a source code visualization platform with information sources and application processing according to an example embodiment. Referring to FIG. 4, the source code visualization platform 400 includes a database of source code 450. The information extracted from the source code may include classes 422, paths or pathways 424 between classes, stations 426 of classes with associations, errors/flaws 428 in the code, and metadata 432 associated with the classes and their characteristics. The program or data to process the code 460 utilizes the source code and its corresponding data attributes to arrive at the display process of stations, semantics, paths/classes, etc. 462. The display can be updated 464 and the code flaws and errors can also be included 466 via the corresponding process modules.

A security scan may contain security warnings which are themselves traces through the code. The traces represent bad data entering the application code and flowing through and exiting the application. The stations may represent API calls within the trace. In a static scan there are a large number of security warnings which share common API calls through the code. The stations represent a way to visually combine all of the security warnings and display how they flow through the code base together. Each path from station to station represents an API calling another API. The metadata is information on the node, or station, itself including but not limited to the vulnerability which this particular trace node belongs to, the number of traces which flow through the station, severity of the item, etc.

FIG. 5 illustrates a user interface of semantic information of classes identified during an error detection procedure according to an example embodiment. The example interface 500 includes a set of classes 510 which may have one or more colors 511 assigned to them to indicate visually when they appear in the map. The example classes 512, 514 and 516 may be identified as having one or more flaws in the application from a preliminary code processing procedure.

According to example embodiments, classes have one or more methods and a method in one class may call methods in itself or in other classes. A method may call another method in various points within itself as well. In the following example, the class 'PatentDocFormatter.format' is called from multiple places within the formatDocData( ) method.

For instance, the example code provides:

```
1.  public class PatentDoc {
2.      private PatentDocIdFormatter formatter;
3.
4.      public void formatDocData( ) {
5.          if ((appId != null) {
6.              formattedAppId = formatter.format(appId);
7.          }
8.
```

-continued

```
 9.     if ((pubId != null) {
10.         formattePubId = formnatter.format(pubId);
11.     }
12.   }
13. }
```

Referring to the above-noted code, the potential code paths shown in the example above would be PatentDoc.formatDocData.Line6->PatentDocIdFormatter.format; and PatentDoc.formatDocData.Line10->PatentDocIdFormatter.format. As a result, the list of locations would be: 1. PatentDoc.formatDocData (start of method); 2. PatentDoc.formatDocData.Line6, which can be simplified to PatentDoc.Line6 . . . because there is only one Line 6 in the file. 3. PatentDoc.Line10, and 4. PatentDocIdFormatter.format (start of method). Those examples translate into nodes/stations in a graph and ultimately "stations" on the diagram. The edges of the graph would be (2,4) and (3,4) from the above list. In the station list on the left side of the diagram includes ParameterParser.java:615' "Calling" Class: Line#, which is enough to identify the location but the second line below helps the user visualize the representation. As for 'ServletRequest.getParameterValues( ) . . . ("Called" Class: Method Name). The second item in the station list is an example of a method that does not call any other methods similar to item '4' above or a linear sequence that is collapsed for readability. This approach identifies the common code path segments and also the different code paths leading into these common code path segments. This permits changes introduced to a common code path segment to take into consideration any dependencies from the lead-in various code paths.

Figure 6:
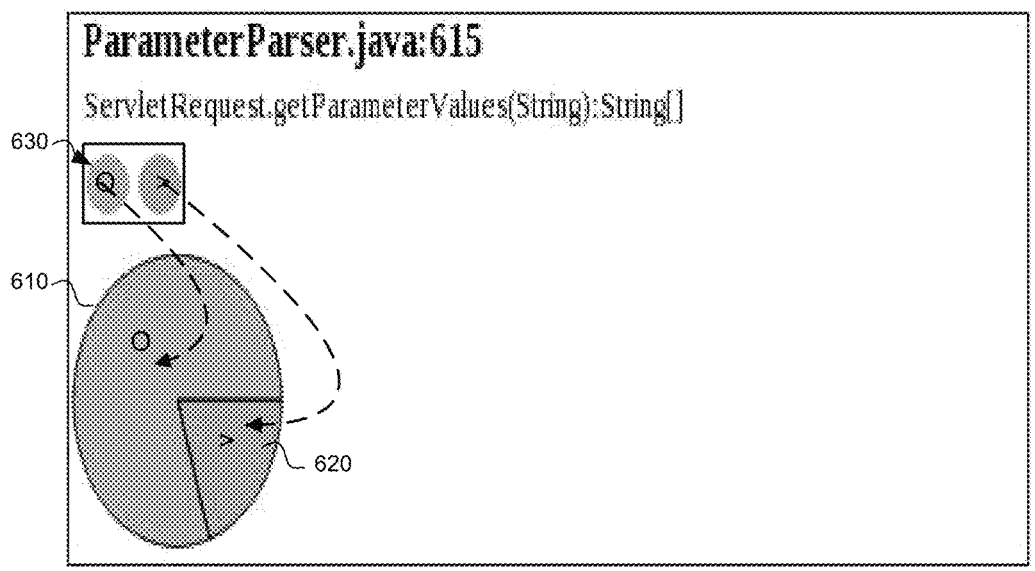
FIG. 6 illustrates a pie chart demonstrating the ratio of vulnerabilities for a given station according to an example embodiment.

FIG. 6 illustrates a pie chart demonstrating the ratio of vulnerabilities for a given station according to an example embodiment. Referring to FIG. 6, the ratio of vulnerabilities for a given station is represented as a pie graph 600. The station is defined as having at least one class and one vulnerability. The key 630 is then shown as a graph to reflect the number of vulnerabilities. The first class identifier 610 is over 75% relevant and the other class identifier 620 is less than 25% relevant. This permits a user to quickly identify what types of vulnerabilities flow through the station. In the visualization, knowing how many paths there are through each node is relevant for understanding the importance of nodes and edges in the graph. Such information can be represented in a number of ways, for example by a number of paths passing through an edge which is displayed adjacent to an edge near and end. Also, the ratio of paths in each class to total paths on each station is represented in the station's pie chart in the station list.

Figure 7:
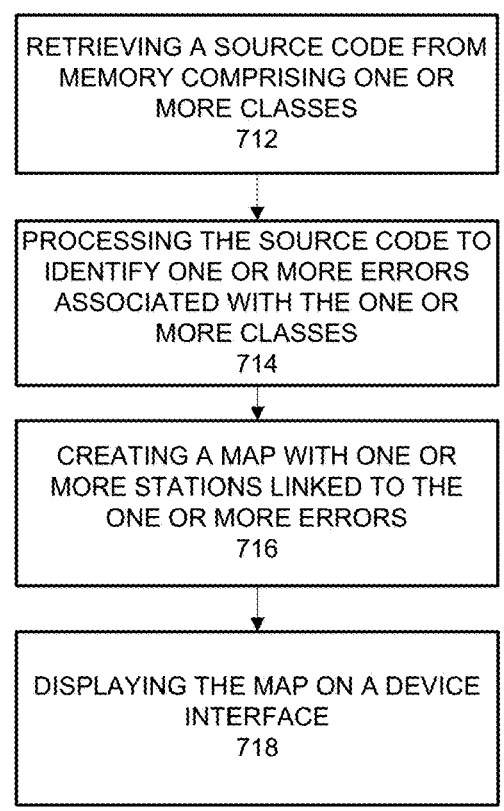
FIG. 7 illustrates an example method of operation according to an example embodiment.

FIG. 7 illustrates a method of operation according to an example embodiment. Referring to FIG. 7, the flow diagram 700 includes one or more of retrieving source code comprising one or more classes from memory 712, processing the source code to identify one or more errors associated with the one or more classes 714, creating a map with one or more stations linked to the one or more errors 716 and displaying the map on a device 718. The method can also include generating semantic information of the one or more classes and linking the semantic information to the one or more classes. In one example, the one or more classes includes a plurality of classes and the one or more stations includes a plurality of stations and the map includes the plurality of stations linked together via one or more pathways. The plurality of stations are tagged with one or more indicators representing one or more of the plurality of classes. The method also includes creating metadata associated with the station, the metadata including one or more of an error associated with the station, a number of traces which flow through the station, and a severity level of the station. The pathways from station to station represent an application programming interface (API) calling another API. The one or more of the stations include multiple class stations which are linked to multiple classes.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent or be integrated in any of the above-described components, etc.

Figure 8:
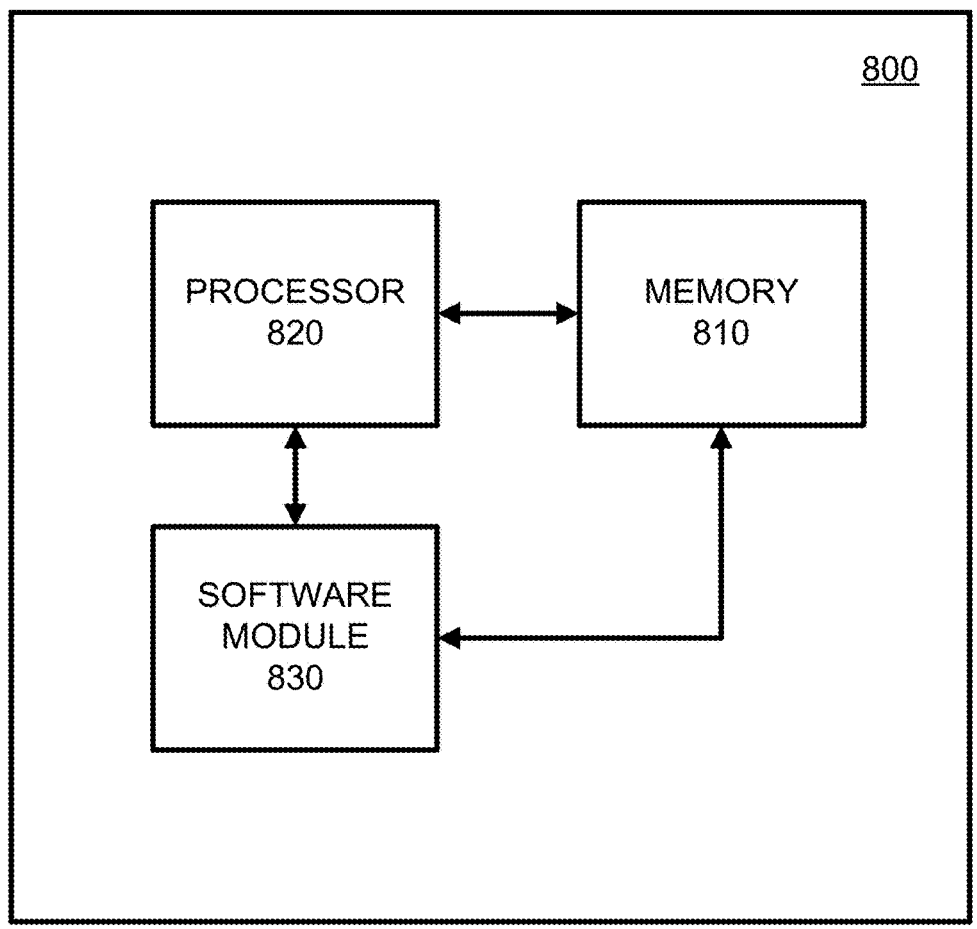
FIG. 8 illustrates a computer readable medium and non-transitory computer processing platform for performing procedures according to an example embodiment of the present application.

As illustrated in FIG. 8, a memory 810 and a processor 820 may be discrete components of a network entity 800 that are used to execute an application or set of operations as described herein. The application may be coded in software in a computer language understood by the processor 820, and stored in a computer readable medium, such as, a memory 810. The computer readable medium may be a non-transitory computer readable medium that includes tangible hardware components, such as memory, that can store software. Furthermore, a software module 830 may be another discrete entity that is part of the network entity 800, and which contains software instructions that may be executed by the processor 820 to effectuate one or more of the functions described herein. In addition to the above noted components of the network entity 800, the network entity 800 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying one or more errors associated with one or more classes that occur during an execution of source code;
creating a map that visually displays a plurality of stations linked to the one or more errors, wherein each station represents a unique data flow location within the source code being executed; and
labeling a station on the map to indicate code that shares a class with code represented by at least one other station from among the plurality of stations.

2. The method of claim 1, further comprising generating semantic information of the one or more classes and linking the semantic information to the one or more classes.

3. The method of claim 1, wherein the map further includes dynamic data flow paths between the stations that occur during the execution of the source code.

4. The method of claim 1, wherein a single path between two stations on the map represents a plurality of dataflows between the two stations that occur while the source code is executing, wherein the map further comprises an indicator that indicates that the single path represents a plurality of data flows.

5. The method of claim 1, further comprising creating metadata associated with a station, the metadata comprising one or more of an error associated with the station, a number of traces which flow through the station, and a severity level of the station.

6. The method of claim 1, wherein a path between two stations on the map represents one or more of:
an application programming interface (API) calling another API; and
data sequentially flowing between a first API and a second API while the source code is executing.

7. The method of claim 1, wherein one or more of the plurality of stations comprise multiple class stations which are linked to multiple classes.

8. An apparatus, comprising:
a processor configured to:
identify one or more errors associated with one or more classes that occur during an execution of source code;
create a map that visually displays a plurality of stations linked to the one or more errors, wherein each station represents a unique data flow location within the source code being executed; and
label a station on the map to indicate code that shares a class with code represented by at least one other station from among the plurality of stations.

9. The apparatus of claim 8, wherein the processor is further configured to generate semantic information of the one or more classes and link the semantic information to the one or more classes.

10. The apparatus of claim 8, wherein the map further includes dynamic data flow paths between the stations that occur during the execution of the source code.

11. The apparatus of claim 8, wherein a single path between two stations on the map represents a plurality of dataflows between the two stations that occur while the source code is executing, wherein the map further comprises an indicator that indicates that the single path represents a plurality of data flows.

12. The apparatus of claim 8, wherein the processor is further configured to create metadata associated with a station, and the metadata comprises one or more of an error associated with the station, a number of traces which flow through the station, and a severity level of the station.

13. The apparatus of claim 8, wherein a path between two stations on the map represents one or more of:
an application programming interface (API) that calls another API; and
data sequentially flowing between a first API and a second API while the source code is executing.

14. The apparatus of claim 8, wherein one or more of the plurality of stations comprise multiple class stations which are linked to multiple classes.

15. A non-transitory computer readable storage medium configured to store instructions that when executed cause a processor to perform:
identifying one or more errors associated with one or more classes that occur during an execution of source code;
creating a map that visually displays a plurality of stations linked to the one or more errors, wherein each station represents a unique data flow location within the source code being executed; and
labeling a station on the map to indicate code that shares a class with code represented by at least one other station from among the plurality of stations.

16. The non-transitory computer readable storage medium of claim 15, wherein the processor is further configured to perform generating semantic information of the one or more classes and linking the semantic information to the one or more classes.

17. The non-transitory computer readable storage medium of claim 15, wherein the map further includes dynamic data flow paths between the stations that occur during the execution of the source code.

18. The non-transitory computer readable storage medium of claim 15, wherein a single path between two stations on the map represents a plurality of dataflows between the two stations that occur while the source code is executing, wherein the map further comprises an indicator that indicates that the single path represents a plurality of data flows.

19. The non-transitory computer readable storage medium of claim 15, wherein the processor is further configured to perform creating metadata associated with a station, and the metadata comprises one or more of an error associated with the station, a number of traces which flow through the station, and a severity level of the station.

20. The non-transitory computer readable storage medium of claim 15, wherein a path between two stations on the map represents one or more of:
an application programming interface (API) calling another API; and
data sequentially flowing between a first API and a second API while the source code is executing.

* * * * *